United States Patent [19]

Mordaunt et al.

[11] Patent Number: 4,750,429
[45] Date of Patent: Jun. 14, 1988

[54] TRANSPORTATION SYSTEMS

[75] Inventors: Terence C. Mordaunt, Capheaton; Francis C. Perrott, Cirencester, both of England

[73] Assignee: Flyda-Mordaunt Limited, Gosforth, England

[21] Appl. No.: 732,755

[22] Filed: May 9, 1985

[30] Foreign Application Priority Data

May 9, 1984 [GB] United Kingdom ............... 8411738
Jul. 28, 1984 [GB] United Kingdom ............... 8419314

[51] Int. Cl.$^4$ ............................................. B61B 3/02
[52] U.S. Cl. ....................................... 104/98; 104/48; 104/88; 104/91; 105/148; 212/205
[58] Field of Search ............ 104/88, 89, 91, 98, 104/130, 48, 131; 105/148, 155; 212/205

[56] References Cited

U.S. PATENT DOCUMENTS

| 2,598,750 | 6/1952 | Borgehr | 104/48 X |
| 2,922,381 | 1/1960 | Horni | 104/48 |
| 3,590,743 | 7/1971 | Larson | 104/88 X |
| 3,926,126 | 12/1975 | Voss | 104/130 |
| 4,243,147 | 1/1981 | Twitchell et al. | 104/89 X |
| 4,273,053 | 6/1981 | Gibbs | 104/88 X |
| 4,372,219 | 2/1983 | Gibbs | 104/88 X |

FOREIGN PATENT DOCUMENTS 8503277 8/1985 World Int. Prop. O. ............ 104/91

Primary Examiner—Andres Kashnikow
Assistant Examiner—Joseph D. Pape
Attorney, Agent, or Firm—Young & Thompson

[57] ABSTRACT

A transportation system, particularly for handling containers for transport by rail vehicles, lorries or ships, includes an elevated guideway comprising a plurality of spaced parallel longitudinal tracks connected by tranverse tracks which are movable along the longitudinal tracks. Vehicles travel along the tracks and are equipped with hoists for lifting containers beneath the guideway into the vehicles. Each vehicle is equipped with lower wheels which run on rails on the longitudinal tracks and upper wheels which run on high level guides on the transverse tracks. When it is wished to transfer the vehicle from one track to another at a junction this may be effected by stopping the vehicle at the junction engaging the appropriate wheels with the guides or rails, as the case may be, on the other track and then continuing movement along that other track. By suitable location of the transverse tracks and movement of the vehicle, containers can be picked up or deposited at any position within the total area covered by the guideway. There may be mounted at one side of the guideway a movable gantry on to which vehicles may be transferred from the guideway for transporting containers into and out of ships.

13 Claims, 6 Drawing Sheets

TRANSPORTATION SYSTEMS

BACKGROUND OF THE INVENTION

The invention relates to transportation systems of the kind comprising a guideway and a number of vehicles movable along the guideway. Although the invention is applicable to transportation systems for any purpose, including the transport of passengers as well as goods, it is particularly applicable to systems in which the vehicles are adapted to handle containers, that is to say for stacking, unstacking, sorting and moving containers as well as loading them into or unloading them from carriers such as rail vehicles, lorries or ships.

Conventionally, the loading of containers into and from ships is carried out by fixed dockside swing cranes and is a time-consuming operation requiring judgement and skill on the part of the crane operator as well as the use of additional manpower to effect the precise location of a container as it is set down in the hold of the ship or on the shore.

Also, time taken to load or unload containers is partly determined by the time taken for the crane to swing, unladen, to the stack of containers to collect the next container for loading or unloading. It is generally not practical for a plurality of cranes to operate on the same batch of containers simultaneously and consequently no loading takes place while a crane is returning to pick up another container. Furthermore, since the range of operation of the crane is comparatively limited, there is a limit to the number of containers which can be brought within the crane's range of operation and this may lead to delays between loading of stacks of containers while further containers are brought within the crane's range of operation. Road and rail vehicles may have to remain idle pending removal from them of containers which are to be loaded on board ship.

Accordingly, the invention sets out to provide a transportation system which, although not exclusively applicable to container handling, is particularly suitable for such purpose and may allow the substantially continuous loading or unloading of containers over a large area.

SUMMARY OF THE INVENTION

According to the invention there is provided a transportation system comprising a guideway and a number of vehicles movable along the guideway, which guideway comprises a plurality of track portions engageable by follower means on each vehicle and a plurality of junctions where two track portions intersect at an angle, the follower means being selectively engageable with either of the track portions at a junction whereby the vehicle may be caused to transfer from one track portion to another at the junction, if required, by stopping the vehicle at the junction, engaging the follower means with said other track portion and then resuming the movement along said other track portion and at an angle to the previous direction of movement.

Preferably the follower means are such that, at each junction, the vehicle may transfer from one track portion to the other without any change in the absolute orientation of the vehicle.

In use, the track portions of the guideway may thus be set out generally in the form of a grid extending over a large area and vehicles, by suitable transfer at the junctions of the grid, may be routed from any location on the grid to any other location, thus providing complete flexibility of operation. Vehicles may, for example, travel continuously in a closed path between two or more locations so that, for example, where the vehicles are equipped for container handling, a plurality of vehicles may transfer containers successively from one location to another and when said one location has been exhausted may continue without interruption to deal with containers from another location covered by the guideway grid. Specific arrangements for operation in this fashion will be described later.

The follower means on each vehicle may comprise first and second follower assemblies so arranged that at a junction, one assembly is engageable with one track portion and the other assembly is engageable with the other track portion.

The two track portions intersecting at a junction may have guides, for engagement by said follower assemblies respectively, which are located in different positions relatively to the vehicle.

Preferably each follower assembly co-operates with its associate guide in a manner wholly or partly to support the vehicle in addition to guiding it.

Preferably the guide on one track portion, for engagement by one follower assembly, is located adjacent an upper region of the vehicle and the guide on the other track portion, for engagement by the other follower assembly, is located adjacent a lower region of the vehicle. In this case one guide may be in the form of a track located above the vehicle and from which the vehicle is suspended, and the other guide may be in the form of a track located below the vehicle and on which the vehicle runs.

In such arrangements, the two track portions at each junction may be of two different types, one type carrying only one kind of guide and the other type carrying only the other type of guide.

Preferably each follower assembly is extendable with respect to the vehicle for engagement with its associated guide and retractable with respect to the vehicle for disengagement from its associated guide.

Each follower assembly may comprise wheels rotatably mounted on the vehicle and rollingly engageable with their associated guides. Preferably at least one of said wheels is also power driven, for example electrically or hydraulically, for moving the vehicle along the guideway.

The guideway may comprise a plurality of longitudinal track portions spaced apart and extending in generally the same direction, and a plurality of transverse track portions extending transversely of the longitudinal track portions. Each transverse track portion preferably extends between two adjacent spaced longitudinal track portions.

In one particular embodiment, the guideway comprises a plurality of spaced substantially parallel longitudinal track portions, each pair of adjacent longitudinal track portions being interconnected by one or more transverse track portions. Preferably the transverse track portions extend at right angles to the longitudinal track portions.

The track portions may be supported above ground level so that vehicles moving over the guideway may operate on objects located below the guideway. For example, each vehicle may include a hoist mechanism for lifting objects, such as containers, from the ground, or a stack of objects at ground level, and transporting them. Preferably the vehicle is adapted to accommodate an object hoisted thereby, so as to be capable of transferring from one track portion to another at a junction while carrying the object.

Two or more track portions may be supported cantilever fashion at a side or end of the guideway. For example, such an arrangement may be required for transporting vehicles and their loads over ships anchored at a dockside.

In any of the above arrangements, one of the two track portions which intercept at a junction may be bodily movable longitudinally of the other track portion so that the location of the junction may be changed. Thus, in the case where the guideway is in the form of a grid the configuration of the grid may be varied by relocation of the transverse track portions. The transverse track portions may either be moved to fresh locations determined by the required path of travel of the vehicles, the transverse track portions remaining at those locations until a new configuration is required, or the movement of the track portions may itself constitute part of the path of movement of the vehicles.

In the case where the guideway comprises a plurality of spaced substantially parallel longitudinal track portions, and each pair of adjacent longitudinal track portions is interconnected by one or more transverse track portions, each longitudinal track portion may have associated therewith a co-extending trackway the ends of the transverse track portions being supported by wheels running along said trackway.

The movement of vehicles along the guideway, and/or the relative movement of track portions of the guideway, may be under automatic computer control, means being provided to sense the location of a vehicle and/or movable track portion, and to feed information regarding the location of the vehicle and/or track portion back to the computer.

DESCRIPTION OF THE PREFERRED EMBODIMENTS

Figure 1:
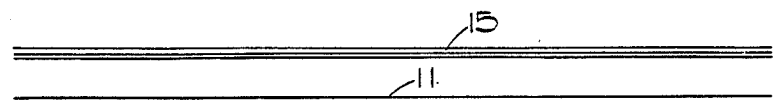
FIG. 1 is a diagrammatic side elevation of a grid-like guideway of a transportation system suitable for the handling of containers and for loading the containers into or unloading them from ships.
Figure 2:
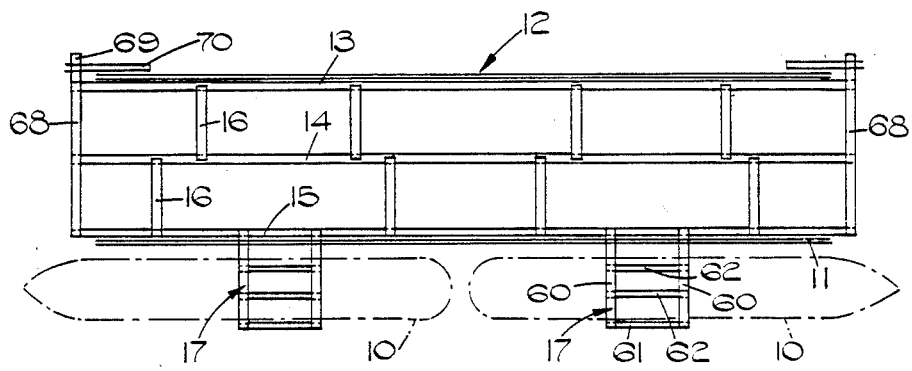
FIG. 2 is a plan view of the guideway.

Referring to FIGS. 1 and 2, there is shown a transport system for loading containers into, and unloading containers from, ships 10 moored along a dockside 11.

The system comprises an elevated track system 12 permanently mounted on the dockside and around which may move vehicles for transporting containers to and from the ships.

The track system 12 comprises a plurality of parallel spaced trackways, such as are indicated at 13, 14 and 15, extending parallel to the dockside 11 and interconnected by transverse trackways 16 to form a generally grid-like structure. The trackways are elevated above ground level, and the vehicles which travel along the trackways are equipped with hoists (to be described) for picking up containers stacked below the trackways and raising them into the vehicle for transport. The vehicles may move longitudinally along the trackways 13, 14 or 15 and transversely along the trackways 16, and may also move onto movable ship-to-shore gantries 17 which extend from the dockside across the holds of the ships 10. The transverse trackways 16 and gantries 17 are mounted so as to be movable longitudinally of the longitudinal trackways 13, 14 and 15, in a manner to be described, and it will thus be seen that by a movement of vehicles along the trackways and gantries, and movement of the transverse trackways 16 and gantries 17 themselves, a container may be moved by a vehicle from any position within the track system to any other position and also to any position within a ship moored at the dockside.

The movement of vehicles around the track system may be under manual or computer control and vehicles may follow a closed path around the track system from any container location to one of the ship-to-shore gantries and then back to the container location or to any other location. Consequently vehicles may follow one another closely and successively around the closed path at any required spaced intervals so as to provide a continuous supply of containers to or from the ships.

To provide such closed path, the transverse trackways 16 may be moved longitudinally to a required location, and then may remain in such location while vehicles are moved around the track system. Alternatively, the longitudinal movement of the transverse trackways 16 themselves may be used to transport one or more vehicles longitudinally of the track system. For loading of containers however, one of the transverse trackways 16 will normally be located over a stack of containers so that vehicles for the time being on the trackway can pick containers from the stack, whereafter each vehicle will travel along the transverse trackway 16, transfer to an adjacent longitudinal trackway 13, 14 or 15 then travel along that longitudinal trackway until it is opposite a ship-to-shore gantry 17, whereupon it will transfer to another transverse trackway 16, which will have been suitably pre-located, so that the vehicle moves transversely until it reaches the dockside longitudinal trackway 15. The vehicle will then travel longitudinally a short distance along that trackway until it reaches the ship-to-shore gantry 17 where it will transfer to the gantry and move on the gantry to a position over the appropriate location in the hold of the ship (in a manner to be described). The vehicle, having deposited the container it was carrying, will then return to the original container stack by a different route, along suitably positioned longitudinal and transverse trackways to pick up another container. In the meantime, succeeding vehicles will continue to deposit their containers into the hold of the ship.

Figure 9:
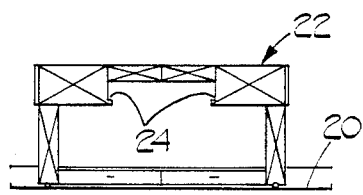
FIG. 9 is an end elevation of a portion of the gantry of FIG. 8.
Figure 10:
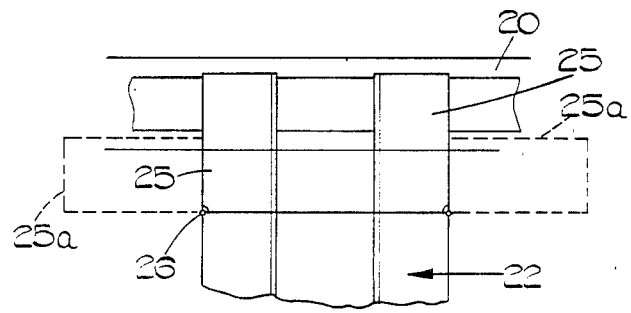
FIG. 10 is a plan view of a portion of the gantry of FIG. 8.

One form of construction for the longitudinal and transverse tracks of the track system will now be described in greater detail with particular reference to FIGS. 3, 9 and 10.

Figure 3:
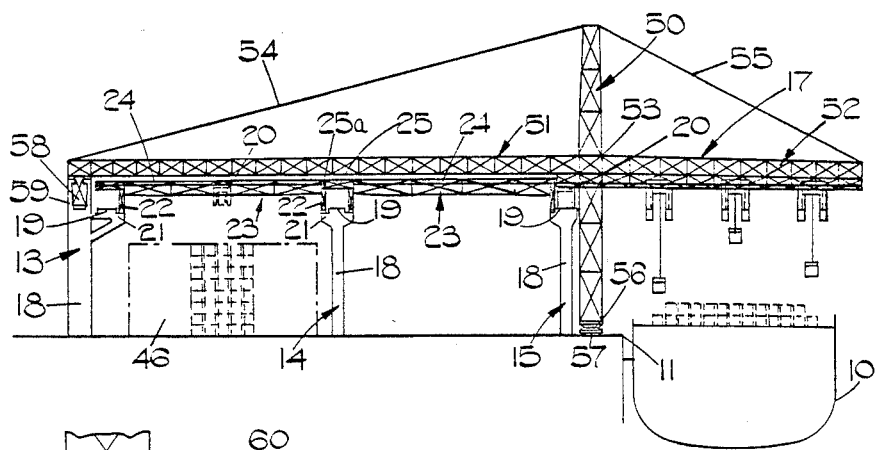
FIG. 3 is a vertical section through a portion of the guideway.

As best seen in FIG. 3, each of the longitudinal trackways 13, 14 and 15 comprises a plurality of spaced vertical support posts 18 supporting an elevated track 19. The track 19 comprises spaced parallel rails which provide bottom support for a wheeled vehicle 20 running along the track. Each track 19 will be referred to as a low-level longitudinal track, since it provides each vehicle with bottom support.

Adjacent each low-level longitudinal track 19 is a further track 21 along which runs a wheeled support 22 at one end of a transverse gantry 23, which constitutes one of the transverse trackways 16 indicated diagrammatically in FIG. 2.

Each gantry 23 carries a high-level track 24 from which a vehicle may be suspended. In a manner to be described, each vehicle 20 is provided with low-level wheeled followers which engage and support the vehicle on the low-level longitudinal tracks 19, and high-level wheeled followers which engage and support the vehicle on the high-level tracks 24. At a junction between a low-level longitudinal track 19 and a high-level track 24 on a gantry 23, the followers on a vehicle may be selectively operated in a manner to be described so that a vehicle may transfer from a longitudinal trackway to a transverse gantry.

To enable a vehicle to transfer from a low-level track 19 to a high-level track 24, or vice versa, each high-level track 24 has, at each end thereof, an extension 25 which projects across and above the low-level track 19 so that at a junction between a low-level track 19 and a transverse gantry 23, the appropriate followers on the vehicle may be operated selectively, if required, to engage either the low-level track 19 or the high-level track extension 25, as the case may be. To enable two transverse gantries 23 to pass one another, the extensions 25 are hingedly connected to the gantries, as indicated at 26 in FIG. 10, so that the extensions on one of the gantries may be swung to a longitudinal position, as indicated at 25a 7in FIG. 10 and FIG. 3, so as to clear the extensions on the adjacent transverse gantry.

Figure 5:
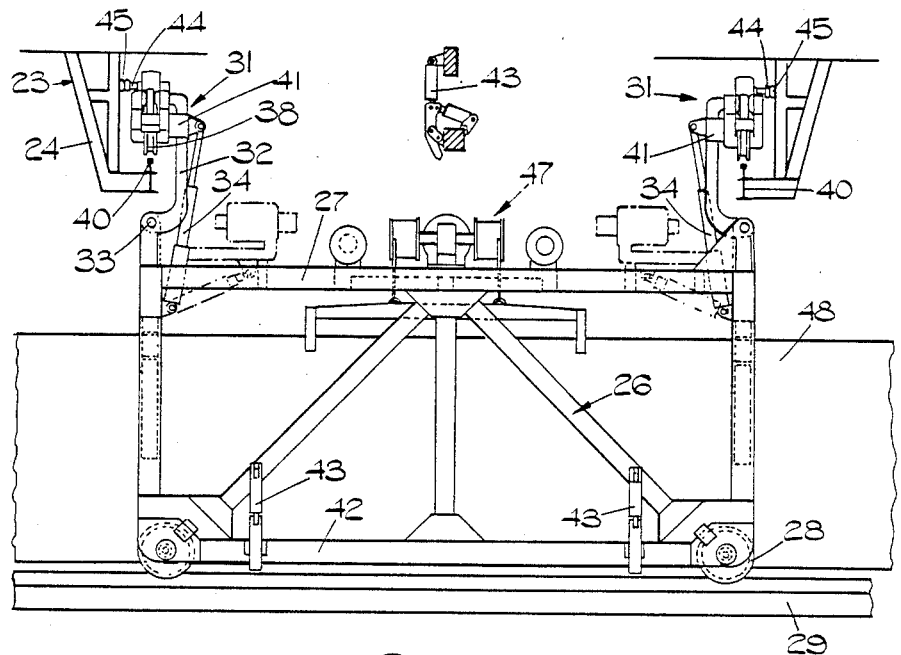
FIG. 5 is a side elevation of a vehicle movable over the guideway.
Figure 6:
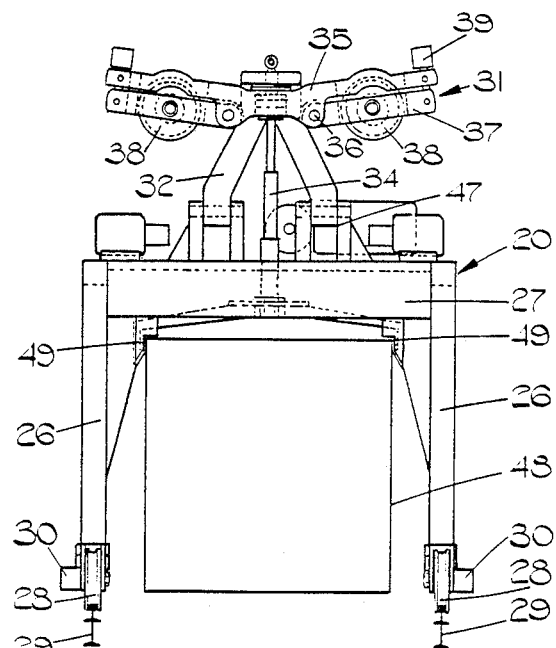
FIG. 6 is an end elevation of the vehicle.
Figure 7:
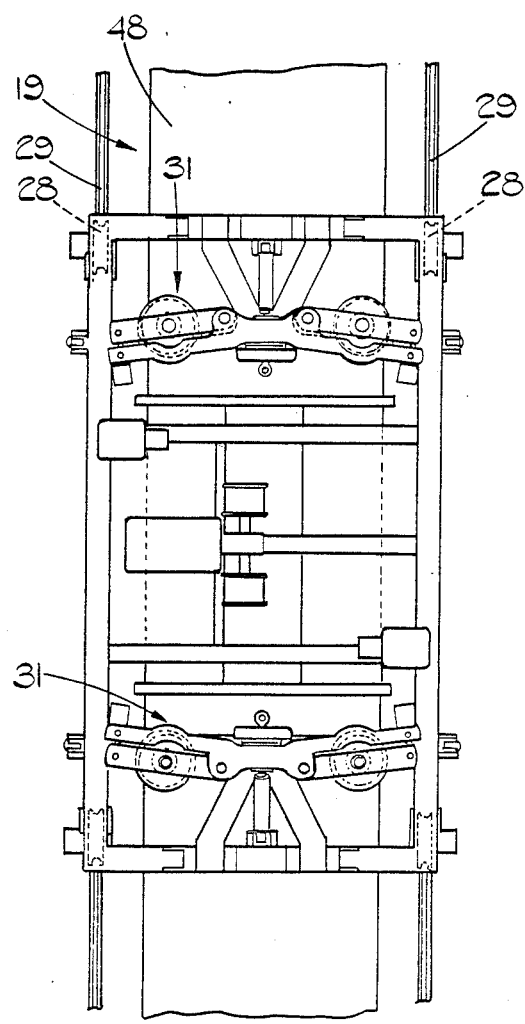
FIG. 7 is a plan view of the vehicle.

FIGS. 5, 6 and 7 show in greater detail the construction of each vehicle and the follower assemblies for engagement with the low level and high level tracks respectively.

Referring to FIGS. 5 and 6, each vehicle comprises two spaced parallel upright side frames 26 connected by an upper horizontal frame 27 so as to form a bridge structure. The side frames 26 have mounted at their lower corners track followers in the form of load bearing wheels 28 which run on the rails 29 of the longitudinal low-level tracks 19. In the arrangement shown, the wheels 28 are driven by hydraulic motors 30 although it will be appreciated that any other suitable form of drive, such as electric motors, may be used. Electric power may be supplied to the vehicles by collectors which engage bus bars which run alongside the tracks.

For engagement with the high-level track 24, each end of the upper frame 27 has mounted thereon a high-level follower assembly indicated generally at 31. Each high-level follower assembly is retractable and comprises a wishbone 32 which is pivotally mounted at 33 on the upper frame 27 and is movable by a hydraulic ram 34 between an extended operable position, shown in FIGS. 5 and 6, and a retracted position, shown in FIG. 7.

As best seen in FIG. 6, the follower assembly 31 comprises a bogie frame 35 pivotally mounted at its centre on the upper extremity of the wishbone 32. Each end of the bogie frame 35 has pivotally mounted thereon, at 36, a swing arm 37 which carries a guide and support wheel 38. The free end of the swing arm 37 is connected to the extremity of the bogie frame 35 by an hydraulic or electric actuator 39 by means of which the swing arm 37 may be pivoted with respect to the bogie frame. The operation of the follower assembly is as follows:

While the vehicle is travelling with bottom support along the low-level longitudinal track 19, the lower wheels 28 run on the rails 29, and carry the weight of the vehicle. Under these conditions the follower assemblies 31 are retracted as shown in FIG. 7. When the vehicle comes into register with a transverse gantry 23 as shown in FIG. 5, the hydraulic rams 34 are extended so as to swing the follower assemblies 31 upwardly to the extended positions shown in solid lines in FIG. 5. During this movement the wheels 38 are in such position on the bogies 35 that they clear the rails 40 on the high-level track 24. The hydraulic or electric actuators 39 are then operated to swing the arms 37 downwardly to bring the wheels 38 into engagement with the rails 40. Once the wheels 38 have engaged the rails 40, continued swiinging movement of the arms 37 will cause the vehicle to be lifted slightly and this relieves the lower wheels 28 of the weight of the vehicle.

The lower wheels 28 are, on each side of the vehicle, mounted on a frame member 42 which is movable vertically with respect to the rest of the side frame 26 by means of hydraulic actuators 43. Once the high-level follower and support wheels 38 have been engaged with the rails 40, the side frame members 42 are raised by the actuators 43 to raise the lower wheels 28 clear of the low-level rails 29. The vehicle may then be moved transversely along the rails 40 and across the transverse gantry 23 by operation of the drive to the wheels 38 which, again, is by means of hydraulic or electric motors indicated at 41.

Although it is envisaged that computer control of the position of each vehicle may be effected to very small tolerances, there may also be provided means for automatically aligning the vehicle as the high-level followers 31 are engaged. For example, as shown in Figure 5, there may be mounted at the upper end of each wishbone 32 an abutment 44 which is engageable with a fixed abutment 45 on the high-level track 24. Thus, if the vehicle is not initially aligned with the rails 40 on the transverse gantry, the engagement of the abutments 44 with the abutments 45 as the follower assemblies 31 are extended will automatically centre the vehicle with respect to the rails.

When a vehicle is to be transferred from a transverse gantry 23 to a longitudinal track 19 it is moved to the end of the gantry and on to the extension 25 until its bottom support wheels 28 are aligned above the rails 29, whereupon the side frame members 42 are lowered by the actuators 43 to bring the wheels 28 into supporting engagement with the rails 29. The swing arms 37 on the bogies 35 are then swung upwardly to bring the upper support wheels 38 clear of the upper rails 40, whereafter the high-level follower assemblies 31 are retracted to the inoperative position by retraction of the rams 34.

The wheel assemblies may incorporate some form of suspension means, such as gas springing.

As best seen in FIG. 3, a vehicle 20 may thus be brought to any position above a stack of containers 46 by transferring the vehicle on to a transverse gantry 23 and then suitably positioning the gantry, and the vehicle on the gantry, so that the vehicle is over a container to be handled.

Referring to FIGS. 5,6 and 7, the upper frame 27 of the vehicle 20 has mounted thereon a clamping frame and hoist system 47 whereby a clamping frame may be lowered, engaged with a container and then hoisted to bring the container within the vehicle, as indicated at 48 in FIGS. 5, 6 and 7. The container clamping frame and hoist, which may be electrically and/or hydraulically operated, may be of any suitable conventional design used in container handling and will not therefore be described in detail. It will be seen, that the container in the hoisted position is wholly contained, as viewed in section, within the vehicle and thus does not interfere with the transfer of the vehicle between the longitudinal low-level tracks and the transverse high-level tracks. The container may project from the open ends of the vehicle, as shown.

Abutments, such as indicated at 49 in FIG. 6, are provided on the bridge structure of the vehicle to locate and stabilise the container 48 within the vehicle.

The construction and operation of the ship-to-shore gantries 17 will now be described with reference to FIGS. 3, 4 and 8.

Each ship-to-shore gantry 17 comprises a leg frame structure 50 which extends vertically. Extending inland across the dockside from the leg structure 50 is a horizontal support structure 51. A horizontal boom structure 52 extends from the other side of the leg structure, beyond the dockside and above the ship 10 as best seen in FIG. 3. The boom 52 is hingedly connected to the vertical leg structure 50 as indicated at 53. Support backstays 54 extend from the top of the leg structure 50 to the inland end of the support structure 51, and forestays 55 extend from the extremity of the boom structure 52 to the upper end of the leg structure 50. The forestays 55 are operable by conventional mechanisms, not shown, to raise and lower the boom 52, as required. The lower part of the leg structure 50 is formed with wheeled resilient carriers 56 which run along a waterside track 57 parallel and adjacent the dockside 11.

The inner extremity of the horizontal support structure 51 has mounted thereon a landside carriage 58 which is a bogie structure which engages with a landside track 59 which extends across the upper ends of the posts making up the longitudinal trackway 13 furthest from the dockside. The engagement between the bogie structures 58 and the track 59 is such as to hold down the inland end of the support structure and thus provide a downward balancing force to counteract the load on the boom portion of the ship-to-shore gantry.

Alternatively or additionally, the inboard end of the ship-to-shore gantry may be provided with rollers which engage beneath an overhead track to provide the necessary downward load on the inland end of the gantry.

As best seen in FIG. 2, the boom structure 52 of each gantry 17 comprises two parallel side beams 60 interconnected at their free end by a fixed end gantry 61 and further interconnected by two boom gantries 62 which are movable along the beams 60 towards and away from the dockside 11.

Figure 4:
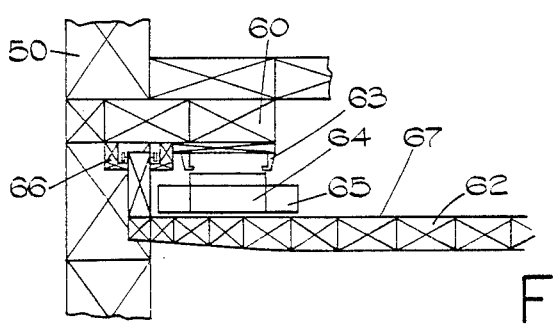
FIG. 4 is an enlarged view of a portion of the guideway.

Referring to FIG. 4, it will be seen that each side beam 60 includes a high-level track 63 along which a vehicle 64 carrying a container 65 may travel inwardly or outwardly along the boom structure 52. The vehicle is transferred to the high-level track 63 from the low-level longitudinal track 15 which runs along the dockside using the follower mechanisms previously described.

Each boom gantry 62 is suspended at each end from a further high level track 66 which extends along the beam 60 outwardly of the high level track 63. Accordingly, each boom gantry 62 may be adjustably moved towards and away from the dockside, i.e. athwart the ship 10. When the vehicle 64 has travelled along the high-level track 63 to a location where it lies above the boom gantry 62, it may be transferred to a low-level track 67 on the boom gantry 62, using the follower mechanisms previously described. The vehicle 64 may thus move along the boom gantry 62, fore-and-aft of the ship 10, and this, combined with the movement of the gantry 62 itself athwart the ship, enables the vehicle 64 and the container which it is carrying to be located in any position above the hold of the ship. The container may thus be lowered into the hold or raised from the hold at any required location. Furthermore, since the gantry 17 as a whole may be moved in the fore-and-aft direction with respect to the ship, it follows that a container may be located over any part of the whole length of the ship.

It will thus be seen that the transport system described enables containers to be moved in succession at closely spaced intervals from any location within the terminal area covered by the track system to any location in a ship at the dockside. The necessary movements of the gantries and vehicles to achieve a required path of movement may be under computer control to provide the maximum operating efficiency.

The system also allows for repositioning of containers or stacks of containers from one location to another within the terminal area of the track system. The transverse gantries 68 (see FIG. 2) at opposite ends of the track system may be fixed gantries carrying high level tracks for vehicles and may thus extend over all of the longitudinal tracks 13, 14, and 15 as shown. These transverse gantries may be extended as indicated at 69 over longitudinal sidings, one of which is indicated at 70, so that, for example, road or rail vehicles carrying containers to the dock may be halted beneath the sidings to have their containers removed and then stacked within the main area of the track system. The ends of the longitudinal tracks 13, 14 and 15 might also be formed with extensions beyond the main area of the track system to provide the necessary sidings.

The hoist system necessary to raise containers from the hold of a ship or lower such containers into the hold must be capable of greater vertical movement of the containers than is necessary for raising and lowering containers over the shore. The hoist system necessary for operating over the ships is therefore more elaborate, and hence more costly, than is necessary for on-shore use. To avoid the necessity of equipping all vehicles with the elaborate and costly hoist system required for above-ship use, therefore, there may be provided two types of vehicle, one type being equipped with a simple hoist for on-shore use and a second type being equipped with the more elaborate hoist necessary for above-ship use. In this case the above-ship types of vehicle remain at all times on or in the vicinity of the ship-to-shore gantry and means are provided for transferring containers from the on-shore type of vehicle to the above-ship type of vehicle. Such an arrangement is shown in FIGS. 11 and 12.

Figure 11:
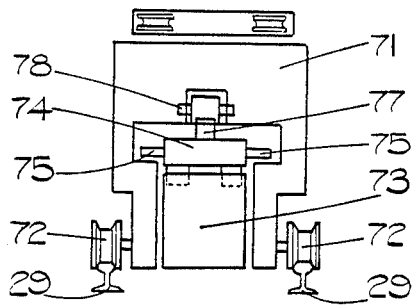
FIG. 11 is a diagrammatic end elevation of an alternative form of vehicle.
Figure 12:
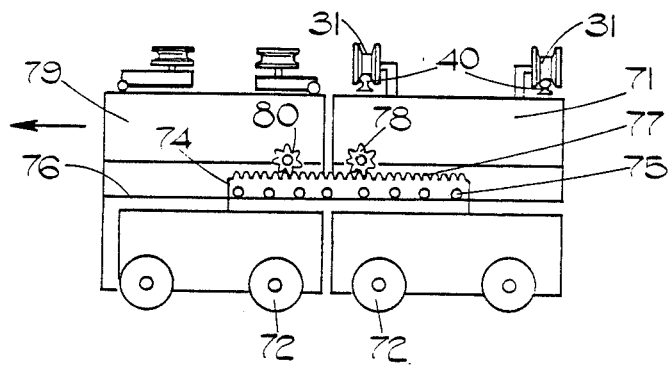
FIG. 12 is a side elevation of the vehicle shown in FIG. 11.

FIG. 11 shows an end elevation of a modified form of container-carrying vehicle 71 supported on under carriage wheels 72 on the aforementioned low-level track rails 29. The container 73 is carried by a clamping frame 74 which is supported on rollers 75 which project from each side of the clamping frame and are capable of supporting its weight on horizontal roller guides 76 which are part of the vehicle 71.

Also attached to the clamping frame 74 is a longitudinal toothed rack 77 engageable by vehicle mounted pinions, such as 78, which are provided with driving means whereby the clamping frame 74 may be moved longitudinally with respect to the vehicle 71. The vehicle is also provided with high-level follower assemblies 31 of the kind previously described for engagement with the high-level rails 40 of the high-level tracks on the transverse gantries and on the side beams 60 of the ship-to-shore gantry boom.

A vehicle which is equipped with an on-shore type of hoist first carries the container along the longitudinal tracks and transverse tracks, in the manner previously described, until the vehicle is positioned on the dockside trackway 15, and adjacent a ship-to-shore gantry. In this position a vehicle which is similar but is equipped with an above-ship type of hoist, such vehicle being indicated at 79, is aligned with the vehicle 71 on the trackway 15. The pinion 78 in the vehicle 71 is then rotated to displace the clamping frame longitudinally of the vehicle 71 until the toothed rack engages a pinion 80 on the vehicle 79. The pinion 78 and 80 then together, and the pinion 80 then alone, continue to rotate to transfer the clamping frame and container wholly to the vehicle 79. When the clamping frame 74 is totally supported by the vehicle 79, the two vehicles separate so that the container (which is longer than the vehicles) is brought clear of the vehicle 71. The vehicle 71 then receives an empty clamping frame 74 from another vehicle having an above-ship hoist which has already deposited its container in the ship's hold and then returns along a predetermined path to the stack of containers to collect another container.

The vehicles may be provided with buffers which extend beyond the containers carried by the vehicles so as to prevent collision between containers carried by adjacent vehicles, although normally the computer control of the movement of vehicles will be such as to prevent such collisions.

Figure 8:
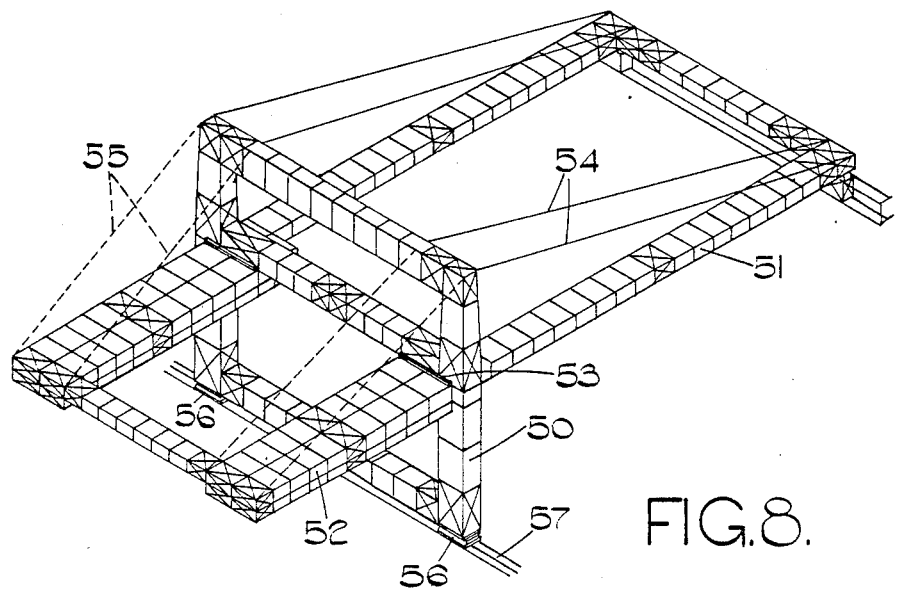
FIG. 8 is a diagrammatic perspective view of a ship-to-shore gantry which may be employed in the transportation system.
Figure 15:
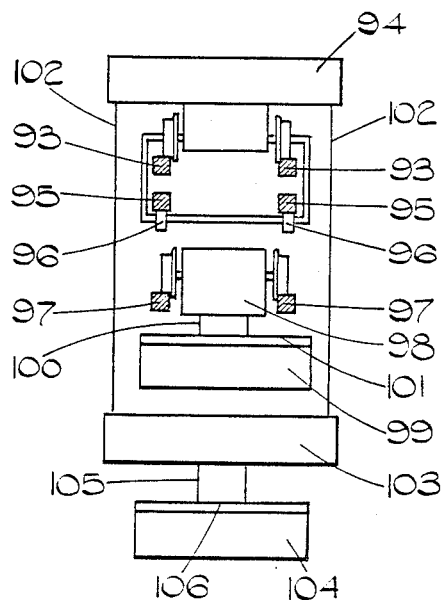
FIG. 15 is a diagrammatic vertical section through the crane boom of the gantry of FIGS. 13 and 14.
Figure 13:
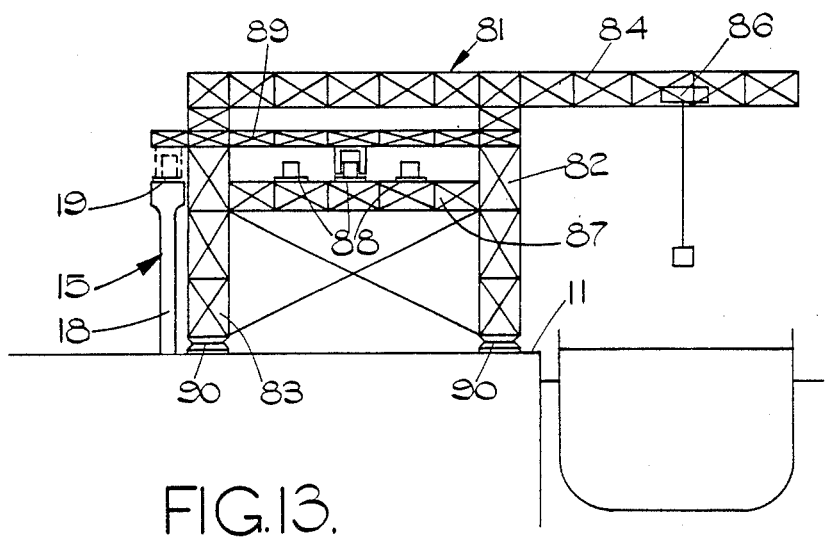
FIG. 13 is a diagrammatic side elevation of an alternative form of ship-to-shore gantry.
Figure 14:
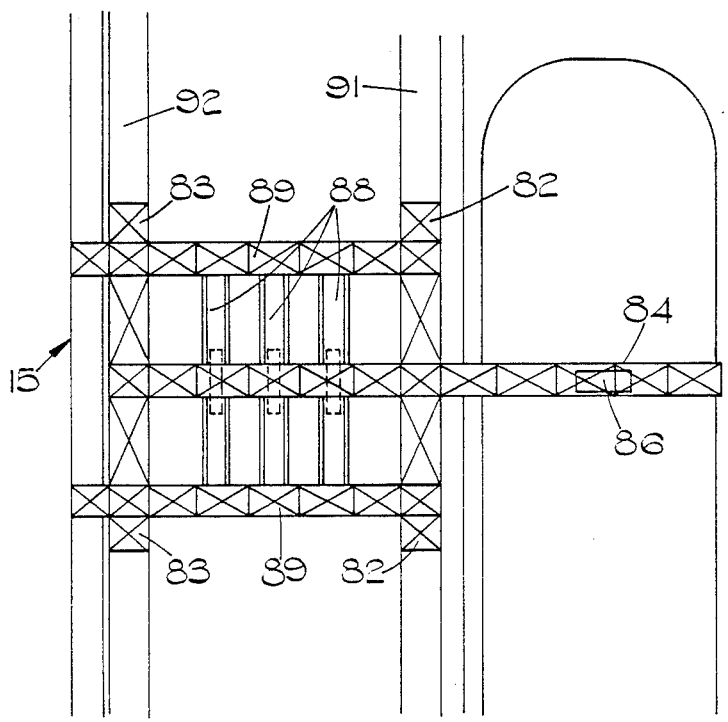
FIG. 14 is a diagrammatic plan view of the gantry of FIG. 13.

FIGS. 13, 14 and 15 show an alternative form of ship-to-shore gantry which may be employed instead of that shown in FIG. 8.

Referring to FIGS. 13 and 14, the alternative form of gantry 81 comprises front vertical support legs 82 and rear vertical support legs 83 interconnected by suitable cross bracing structure which supports a crane boom 84 which extends outwardly beyond the dockside 11 and over the hold of a ship 85. A carriage structure 86 provided with hoists run along tracks extending along the crane boom 84 in a manner to be described in relation to FIG. 15.

At each side of the gantry the front leg 82 is connected to the rear leg 83 by a side boom 87 and the two side booms 87 are interconnected by spaced parallel transverse tracks 88. Three such tracks are shown although any suitable number may be provided. The tracks 88 are such that a vehicle from the main on-shore track system may run on the tracks, which support the vehicle at low level in similar manner to the low level track 19 previously referred to.

Spaced above the support boom 87 at each side of the gantry is a transfer high level track 89 from which a vehicle may be suspended in similar fashion to the high level tracks 24 referred to previously. Each transfer track 89 extends across and above the ends of the transverse low level tracks 88 and extends rearwardly of the gantry 81 so that the rearward extremity of each track 89 extends over the trackway 15 of the on-shore track way system. The rearward extremity of each transfer track 89 is hinged to enable it to pass the ends of high level tracks on the main on-shore system as the gantry is moved along the dockside.

To permit movement of the gantry 81 along the dockside the lower parts of the legs 82 and 83 are formed with wheeled resilient carriers 90 which run along tracks 91 and 92 between the dockside and trackway 15.

In use, the gantry 81 is moved along the tracks 91, 92 to an appropriate position above the hold of the ship 85 and the hoist on the carriage 86 is used to lift a container from the hold of the ship. The carriage 86 then travels inwardly along its track on the crane boom 84 until it is above a selected transverse track 88 whereupon the container is lowered by the hoist on to the selected track. The carriage 86 may then return along the crane boom 84 to pick up another container from the ship.

In the meantime, a vehicle from the onshore track system passes from the trackway 15 onto the transfer high level track 89 and travels along that track until it comes to the end of the appropriate transverse track 88 whereupon the vehicle transfers to that track and travels along it parallel to the dockside, picks up the container previously deposited on the track and then continues towards the opposite transfer track 89 where it is transferred to high level support on that track and moves inwardly along the track 89 back onto the trackway 15.

Thus, containers from the hold may be deposited by the carriage 86 on any transverse track 88 which is free and the vehicles moving on to the gantry from the main on-shore track system may be directed to the appropriate transverse track 88 which bears a container ready to be picked up. By this method delays are kept to a minimum and containers may be picked up continuously from the gantry.

In order further to prevent delays, there may be provided two carriages movable along tracks on the crane boom 84 so that one carriage may be picking up a container from the ship's hold while the other carriage is depositing its container on a transverse track 88 of the gantry. It is necessary, in this case, for the two carriages to be able to pass one another on the crane boom 84, and FIG. 15 shows diagrammatically a means for achieving this.

Referring to FIG. 15, there is provided an upper track comprising spaced parallel rails 93 along which runs an upper wheeled carriage 94. Further rails 95 are spaced vertically below the rails 93 and are engaged by wheels 96 on a frame structure connected beneath the carriage 94, this arrangement serving to stabilise the carriage 94.

Below the rails 96 are spaced further rails 97 providing a lower track and a lower wheeled carriage 98 runs on this lower track. The lower carriage 98 incorporates a hoist mechanism whereby a container 99 may be lifted and lowered by means of cable 100 and a suitable clamping frame 101.

Support cables 102 extend downwardly from the upper carriage 94 on either side of both the upper track 93 and the lower track 97. The lower ends of the support cables 102 are interconnected by a carrier 103 which extends transversely beneath the lower track 97 and includes a hoist whereby a container 104 may be lifted and lowered by means of hoist cables 105 and a clamping frame 106.

It will be seen from FIG. 15 that the arrangement permits containers to be lifted and lowered by the two carriages from the same position beneath the crane boom 84 along which the tracks 93, 96 and 97 run, while at the same time allowing one carriage to pass the other as it travels along the boom. The support cables 102 may be adjustable in length.

It will be appreciated that the arrangement shown in FIG. 15, although particularly applicable to the present invention, might also be used in any crane structure of the kind in which a carriage bearing a hoist runs along a track on the crane boom.

What is claimed is:

1. A transportation system comprising a guideway and a number of vehicles movable along the guideway, which guideway comprises a plurality of spaced substantially parallel longitudinal track portions, and extending between each pair of adjacent longitudinal track portions is at least one transverse track portion, providing junctions where the longitudinal track portions and transverse track portion intersect, each longitudinal track portion having associated therewith a co-extending trackway the ends of the transverse track portion being supported by wheels running along said trackway so that the transverse track portion is bodily movable along the longitudinal track portions so that the locations of said junctions may be changed, the track portions being engageable by follower means on each vehicle and the follower means being selectively engageable with either of the track portions at a junction whereby the vehicle may be caused to transfer from one track portion to another at the junction, if required, by stopping the vehicle at the junction, engaging the follower means with said other track portion and then resuming the movement along said other track portion and at an angle to the previous direction of movement.

2. A transportation system according to claim 1, wherein the follower means are such that, at each junction, the vehicle may transfer from one track portion to the other without any change in the absolute orientation of the vehicle.

3. A transportation system according to claim 2, wherein the follower means on each vehicle comprising first and second follower assemblies so arranged that at a junction, one assembly is engageable with one track portion and the other assembly is engageable with the other track portion.

4. A transportation system according to claim 3, wherein the two track portions intersecting at a junction have guides, for engagement by said follower assemblies respectively, which are located in different positions relatively to the vehicle.

5. A transportation system according to claim 4, wherein each follower assembly co-operates with its associated guide in a manner at least partly to support the vehicle in addition to guiding it.

6. A transportation system according to claim 4, wherein the guide on one track portion, for engagement by one follower assembly, is located adjacent an upper region of the vehicle and a guide on the other track portion, for engagement by the other follower assembly, is located adjacent a lower region of the vehicle.

7. A transportation system according to claim 6, wherein one guide is in the form of a track located above the vehicle and from which the vehicle is suspended, and the other guide is in the form of a track located below the vehicle and on which the vehicle runs.

8. A transportation system according to claim 4, wherein the two track portions at each junction are of two different types, one type carrying only one kind of guide and the other type carrying only the other type of guide.

9. A transportation system according to claim 4, wherein each follower assembly is extendable with respect to the vehicle for engagement with its associated guide and retractable with respect to the vehicle for disengagement from its associated guide.

10. A transportation system according to claim 4, wherein each follower assembly comprises wheels rotatably mounted on the vehicle and rollingly engageable with their associated guides.

11. A transportation system according to claim 10, wherein at least one of said wheels is also power driven for moving the vehicle along the guideway.

12. A transportation system according to claim 1, wherein the track portions are supported above ground level so that vehicles moving over the guideway may operate on objects located below the guideway.

13. A transportation system according to claim 1, wherein the movement of vehicles along the guideway is under automatic computer control, means being provided to sense the location of a vehicle and to feed information regarding the location of the vehicle back to the computer.

* * * * *